United States Patent [19]

French

[11] 4,226,529
[45] Oct. 7, 1980

[54] VIEWING SYSTEMS

[75] Inventor: Herbert A. French, Emsworth, England

[73] Assignee: The Secretary of State for Defence in Her Britannic Majesty's Government of the United Kingdom of Great Britain and Northern Ireland, London, England

[21] Appl. No.: 787,042

[22] Filed: Apr. 12, 1977

[30] Foreign Application Priority Data

Apr. 21, 1976 [GB] United Kingdom ............... 16167/76

[51] Int. Cl.³ .................... G01B 11/26; H04N 7/00
[52] U.S. Cl. ................... 356/5; 250/213 VT; 358/95
[58] Field of Search ............... 358/95; 356/5; 250/213 VT

[56] References Cited

U.S. PATENT DOCUMENTS

| 3,305,633 | 2/1967 | Chernoch | 358/95 |
| 3,443,870 | 5/1969 | Morgan et al. | 356/5 |
| 3,463,588 | 8/1969 | Meyerand, Jr. et al. | 356/5 |
| 3,499,110 | 3/1970 | Heckman, Jr. | 358/95 |
| 3,899,250 | 8/1975 | Bamberg et al. | 358/95 |

Primary Examiner—S. C. Buczinski
Attorney, Agent, or Firm—Cushman, Darby & Cushman

[57] ABSTRACT

The invention relates to a pulsed laser viewing system adapted to view range intervals in a scene by gating the detector signal; according to the invention, the viewing system also includes a switching device for repetitive interchange of the range interval viewed so that the image contrast of a viewed target may be repetitively alternated between positive and negative. The switching device may operate to interchange either the detector gating time periods or the detector signal channel. Alternatively, the switching device may operate to interchange time delays applied to the detector signal before gating.

9 Claims, 4 Drawing Figures

VIEWING SYSTEMS

This invention relates to viewing systems, and more particularly to means for enhancing the image contrast available from targets in a low contrast scene.

Conventional techniques of viewing low-light scenes commonly employ a pulsed laser to enhance target-to-background contrast. The laser may be directed at a target to enhance contrast, or alternatively the viewing system may be gated so that the laser pulses reflected from the background are detected to the exclusion of that from a target. Background light shows targets standing out in silhouette against the scene. The techniques are respectively termed positive contrast and negative contrast, and both operate satisfactorily when the target-to-background contrast is high. Moreover, both possess the added advantage that loss of contrast due to atmospheric scattering can be reduced to some extent by gating the viewing system, thus restricting its sensitivity to a particular range interval. Gated viewing systems are operated by restricting the sensitivity of a viewing system to within time periods beginning after the emission of one laser pulse and before the emission of the next. This gating procedure results in the viewing system receiving light only from particular intervals of range from the system, the range intervals being sections of the path of the laser pulse and each interval corresponding to a respective gating time period.

When atmospheric scattering increases beyond a certain level, target-to-background contrast is poor, particularly so in the case of long-range viewing. In such atmospheric conditions it has been found that even gated low-light viewing systems have given disappointing performance. The present invention provides apparatus for enhancing the target-to-background contrast in a laser-assisted low-light viewing system.

According to the present invention, a laser-assisted viewing system includes at least one laser arranged for repetitive pulsing, one or more detectors to detect laser pulses after reflection or scattering from a scene, detector signal gating means to define range intervals within the scene for viewing by the said system, means to register an image of any defined range interval, and means for repetitive interchange of the defined range interval from which the registered image is derived.

To achieve repetitive interchange of the defined range interval, means may be provided for repetitive interchange of the corresponding gating time period during which the signal gating means is operative. Alternatively, the detector output may be connected to a variable electronic delay device itself connected to signal gating means operative for a fixed time period; repetitive interchange of the range interval is then obtained by repetitive interchange of the delay applied to the detector output. As a further alternative, each range interval may be detected by a respective detector with appropriate gating; each gated detector would then define a signal channel for a respective range interval, and the range intervals may be respectively interchanged by switching between channels.

For the purposes of this specification, the term image registering means is interpreted to mean an image recording device or an image display device. A cathode ray tube provides a convenient image display device, and image recording may be obtained by the use of a computer memory or other recording means. Image display may take place subsequent to signal or image processing for purposes of image identification, and similarly image recording may be carried out prior or subsequent to such processing.

In a further aspect of the invention, a laser-assisted viewing system includes two or more lasers arranged for repetitive pulsing at respective output wavelengths. The output wavelength, pulse length and repetition frequency of each laser are preferably chosen to maximise the sensitivity of the viewing system to the optical properties of targets and backgrounds. Sensitivity is optimised by maximising the reflective or scattering process by which laser energy is returned to the viewing system. Typical backgrounds, frequently, although not necessarily, consist of a atmospheric mist or haze, or alternatively smoke, and such backgrounds are characterised by the optical scattering they produce in light of sufficiently short wavelengths.

In order that the invention may be more fully understood, one embodiment thereof will now be described, by way of example only, with reference to the accompanying drawings, in which.

Figure 1:
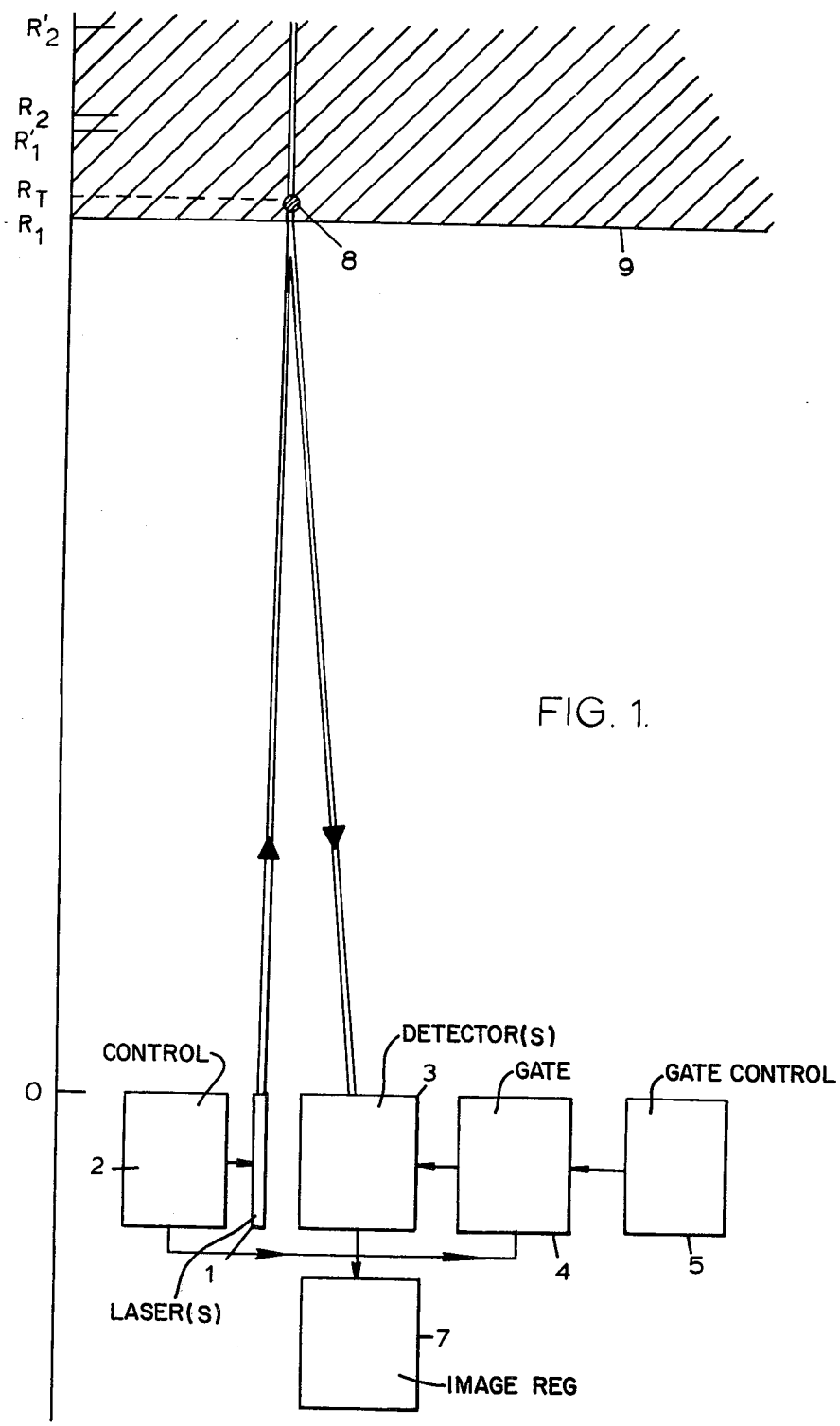
FIG. 1 illustrates a laser-assisted viewing system of the invention

FIG. 1 is a schematic diagram of a laser-assisted viewing system including a pulse laser unit 1 which may include two lasers arranged for repetitive pulsing and associated laser control unit 2. The system further includes a detector 3 sensitive to the laser output wavelength, and the detector 3 is gated by a gating unit 4. The gating time period of the gating unit 4 is controlled by a gating control unit 5. A connection 6 supplies information on the phase of the laser output from the laser control unit 2 to the gating unit 4. The detector 3 supplies image information to an image registering device 7. The laser 1 is arranged to illuminate a scene containing a target 8 and a background region 9 extending beyond the target 8. The detector unit 3 which may include two detectors arranged for cyclical gating is arranged to receive laser pulses after reflection from the target 8 and background 9. The target 8 is at a range distant $R_T$ from the viewing system. Range from the viewing system is measured against a scale 10 marked with range indicators O, $R_1$, $R_T$, $R'_1$, $R_2$, and $R'_2$.

Figures 2, 3:
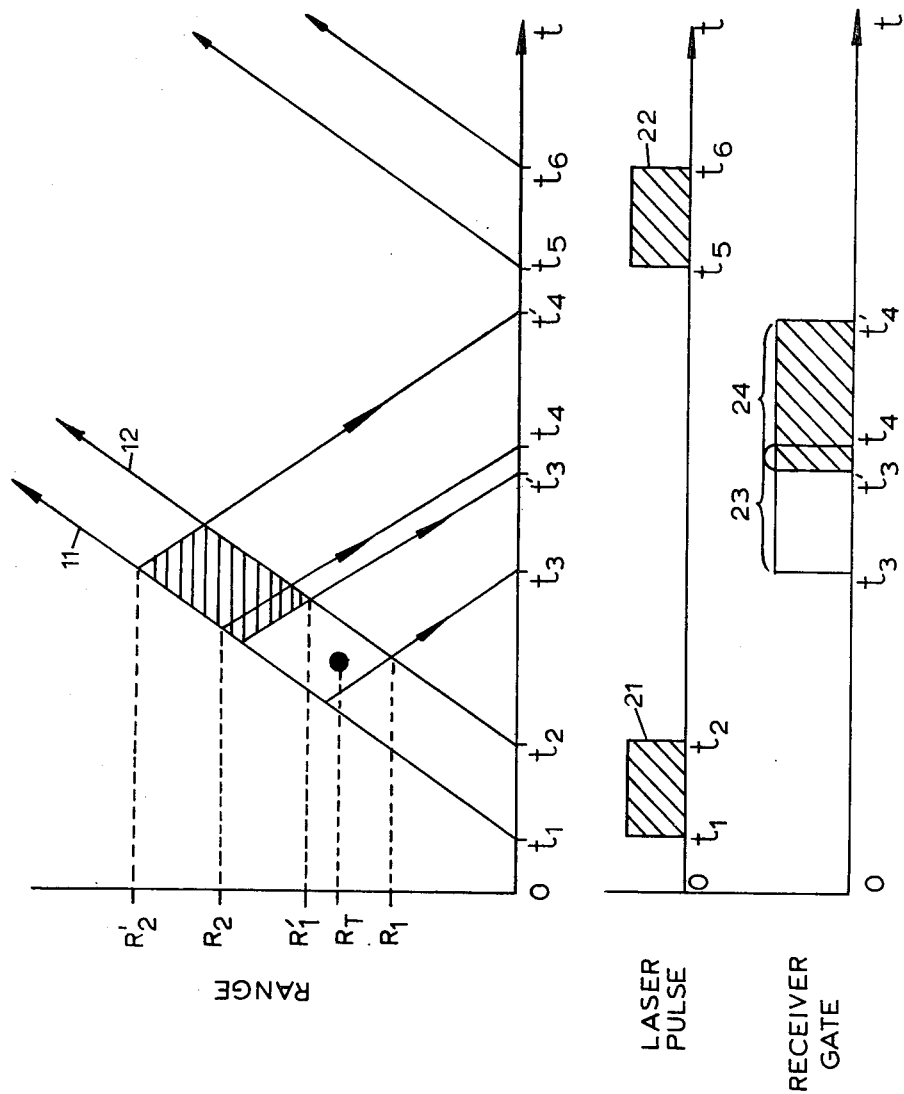
FIG. 2 is a graph of range against time illustrating the operation of a viewing system of the invention.
FIG. 3 illustrates the relative phasing of laser pulses and receiver gating.

FIG. 2 is a graphical representation of Range against Time illustrating the mode of operation of the viewing system. A laser output pulse is initiated by the laser 1 at a time $t_1$ and output of the pulse is terminated at a time $t_2$. The range/time plot of the laser pulse in FIG. 2 comprises two parallel straight lines 11 and 12 through the points (O, $t_1$) and (O, $t_2$) respectively, and both lines have a slope of C, the velocity of light. The detector gating device 4 is capable of defining two gating time periods, and therefore also two corresponding range intervals. The gate is set to open at times $t_3$ or $t'_3$ and close at times $t_4$ or $t'_4$, such that two gating time periods are defined, these being an earlier period $t_3$ to $t_4$ and a later period $t'_3$ to $t'_4$. A second laser pulse begins at $t_5$ and terminates at $t_6$, the interval $t_1$ to $t_5$ defining the pulse-repetition period.

FIG. 3 shows the respective phasing of the laser pulses 21 ($t_1$ to $t_2$) and 22 ($t_5$ to $t_6$) and the detector gating time periods 23 ($t_3$ to $t_4$) and 24 ($t'_3$ to $t'_4$). The detector 3 is gated to operate within either the time period 23 or the time period 24, and the gating control device 5 supplies control signals to switch the gating period from 23 to 24 or vice versa.

The operation of the viewing system will now be described. Consider a target at a range $R_T$ (FIG. 2) from the viewing system, the detector 3 being gated to within the time period 23, ie opening at $t_3$ and closing at $t_4$. With this gating, the detector 3 is sensitive to any radiation it collects, whether by reflection or scattering, from all points in the range interval $R_1$ to $R_2$, where:

$$R_1 = \tfrac{1}{2}(t_3 - t_2)C \quad (1)$$

and $$R_2 = \tfrac{1}{2}(t_4 - t_1)C \quad (2)$$

During the time interval 23 the detector 3 "sees" the target 8 by reflection at range $R_T$, where $R_1 < R_T < R_2$, the image of the target 8 being superimposed on the radiation from the background interval $R_1$ to $R_2$.

When the gating time interval is switched to $t'_3$ to $t'_4$ by the control device 5, the detector 3 is similarly gated to receive radiation from the range interval $R'_1$ to $R'_2$ containing an interval of the background 9 where:

$$R'_1 = \tfrac{1}{2}(t'_3 - t_2)C \quad (3)$$

and $$R'_2 = \tfrac{1}{2}(t'_4 - t_1)C \quad (4)$$

Now $R_T < R_1 < R_2$, so that the detector 3 does not, in this gating mode, receive radiation from the target 8, but a shadow of the target 8 is produced on the radiation reaching the range interval $R'_1$ to $R'_2$ because of the masking effect of the target 8. Accordingly, during the interval 24, the detector "sees" a silhouette of the target 8 appearing upon a range interval of the background 9.

The gating procedure consists of alternating between the two modes of gating described above, thereby interchanging the viewed range interval repetitively. As a result, the detector 3 records the target 8 alternatively by direct reflection and in silhouette. The detector 3 is gated in the $t_3$ to $t_4$ time period which is synchronised with a particular section of each laser pulse-repetition cycle. Accordingly, the gating period is phase-locked to the pulse-repetition frequency, and maintains the defined range interval being viewed. After an appropriate amount of laser energy has been received from this range interval, the gating period is altered to occur later in each pulse-repetition cycle, thereby changing the range interval being viewed. This altered period is $t'_3$ to $t'_4$ in FIGS. 2 and 3. After an appropriate amount of laser energy has been detected in the second gating mode, the gating is switched back to the $t_3$ to $t_4$ time period. Switching back and forth in this manner is effected by the gating control device 5, which therefore provides the means of interchanging the range intervals repetitively.

A cathode ray tube is a convenient form of image registering means 7, and if the detector 3 is provided with scanning means to produce two-dimensional information, then the target will be displayed on the CRT screen alternately as a direct reflected image and then as a silhouette, against a respective background in either case. The two backgrounds are likely to be substantially the same, particularly so in the case of an aerial target or a seascape, and therefore the target is perceived as a modulated region of a substantially unmodulated background. The length of time for which the viewing system is operated in either gating mode, ie between interchanges of the range interval, is normally adjusted to be long compared with a laser pulse repetition period. This is to allow the viewing system to integrate the image obtained from a respective range interval over a number of laser pulses. The detector is therefore gated in one mode for a number of laser pulses before switching to the other mode to interchange the range intervals. Although each gating time period must be a section of, and therefore phase-locked to, the laser pulse repetition cycle, the interchange between gating periods need not be either regularly periodic or phase-locked to the pulse repetition cycle. It may, of course, be convenient to carry out the interchange periodically and in phase with the pulsed output of the laser.

The two gating time periods 23 and 24 in FIG. 3 need not be equal, as this affects only the mark-space ratio of the image modulation registered by the image registering means 7, the relative energy collected per laser pulse, and the length of the respective range interval observed in each gating mode. The ratio of the two gating time periods is optimised from considerations of the image contrast and energy available in either mode. In some applications the silhouette mode offers greater contrast than the reflection mode, and this is particularly true of long-range viewing of seascapes or airscapes in hazy weather. In such situations it may be appropriate to allow a proportionately longer gating period in the silhouette mode. If, however, the two modes offer similar degrees of image contrast, then sensitivity will be optimised when the gating time periods are correspondingly similar.

The lengths and the phasing of the two gating time periods are not critical, but are subject to the following conditions. Both gating time periods must be shorter than the zero amplitude region of a laser pulse-repetition cycle and the silhouette mode gate must open later than the reflection mode gate to define a target range interval. It is, however, unimportant whether or not the two gated sections of a laser pulse-repetition cycle overlap, since the receiver is gated in one mode only in any given cycle, and so the detector can never be sensitive to both range intervals simultaneously. Furthermore, it is not necessary for the viewing system to be operated in one of only two states, each state corresponding to a respective gating time period. The act of switching between states may, if desired, be arranged to take place via an intermediate stage. The intermediate stage might be for example a passive or non-registering state of the image registering means, or alternatively a state during which additional or different information such as range calibration is registered.

Figure 4:
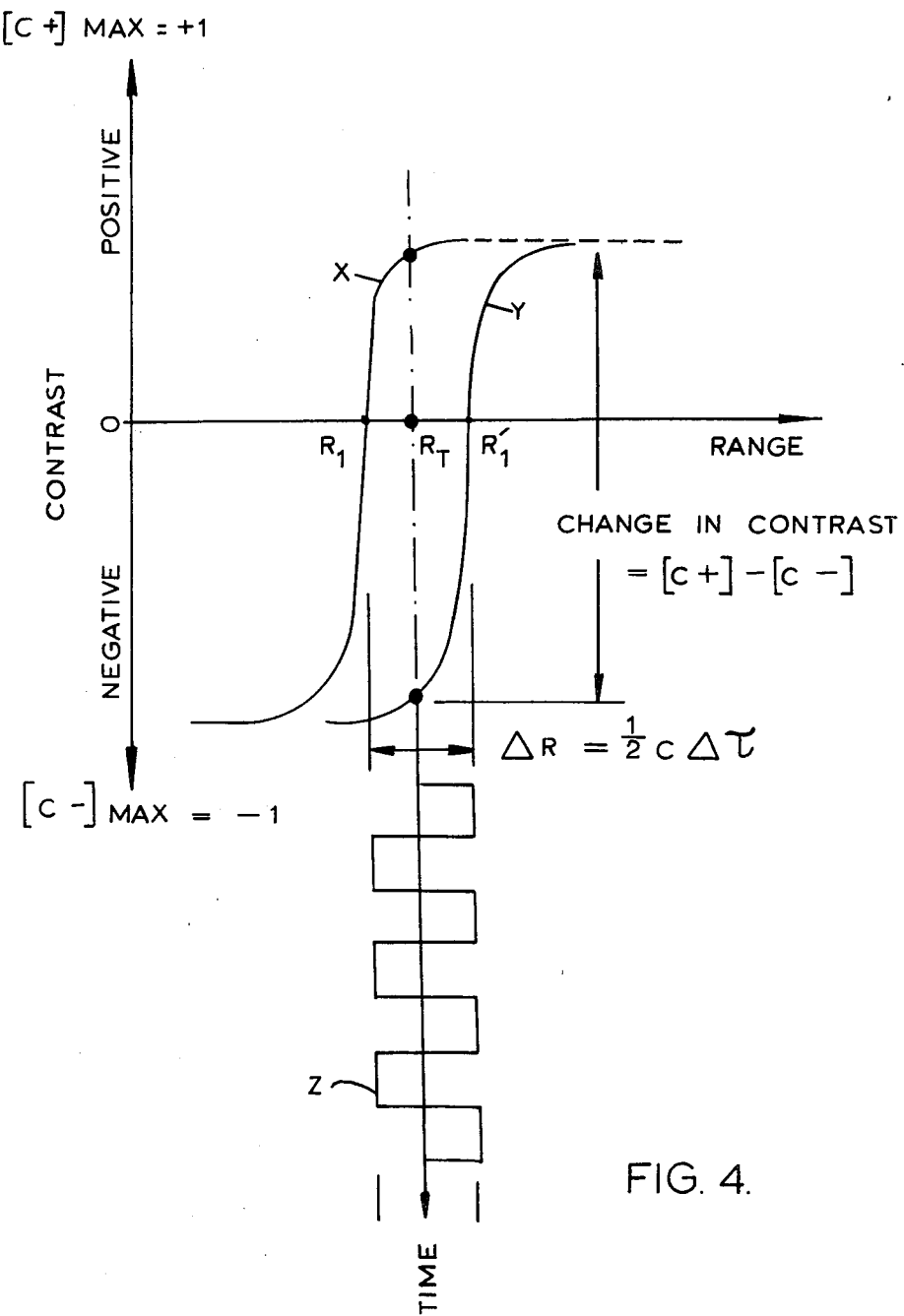
FIG. 4 illustrates switching between positive and negative contrast as provided for by the invention.

FIG. 4 illustrates the potential gains in image contrast obtainable by switching between gating time periods according to the invention. In FIG. 4 image contrast is plotted against range for two values of gating time period. Curve X corresponds to the gate opening at $t_3$ in FIGS. 2 and 3, and curve Y to the gate opening at $t'_3$, the corresponding ranges being $R_1$ and $R'_1$. The target at $R_T$ is in full positive contrast, say [C+], with respect to the gate opening at $t_3$, but in full negative contrast (silhouette), say [C−], with respect to the gate opening at $t'_3$.

From equations (1) and (3):

$$R'_1 - R_1 = \tfrac{1}{2}C(t'_3 - t_2 - t_3 + t_2) \quad (5)$$

ie $$\Delta R = R'_1 - R_1 = \tfrac{1}{2}C(t'_3 - t_3) = \tfrac{1}{2}C\Delta t \quad (6)$$

Where $\Delta t$ is the time differential, and $\Delta R$ the corresponding range differential, between the opening points of the two gates switching back and forth between the two gated periods. The effect of interchanging the gating time periods in this manner is indicated by the square-wave curve Z in FIG. 4, and gives rise to an alternating contrast for any target within $\Delta R$, the alternating contrast having an amplitude of $[C+]-[C-]$. The amplitude of the target contrast variation is thus greater than that due to either gating mode alone. In FIG. 4, maximum values of contrast are defined to be $+1$ for $[C+]$max and $-1$ for $[C-]$max. If the $[C+]$ and $[C-]$ values for the target in FIG. 4 are equal, then the effect of switching the gating period is to double the contrast due to either mode alone, and furthermore to modulate selectively any reflective objects in the range interval $\Delta R$ (in FIG. 4 the target) whilst the background and any scattered radiation remain unmodulated. The differential time period $\Delta t$ may be adjusted to be small compared to either gated time period, and hence the number of reflective objects within $\Delta R$ may be made small compared to the number within the correspondingly larger range intervals from which energy is collected in either gated period.

The property of selectively modulating a target or targets while the background remains unmodulated is a very important feature of the invention. Whatever viewing systemm and associated display is used, a modulated target viewed against a constant background is more conspicuous to an observer, or more detectable by automated monitoring devices, than an unmodulated target in a constant background. The technique is suitable for use with a number of automatic detection systems in addition to visual detection, and the target modulation frequency may be chosen to suit a particular application. For visual monitoring, a modulation frequency of about 5 Hz would be appropriate, as this appears to be a rate which makes the target most conspicuous to a human operator. Automatic detection systems could, of course, employ much faster modulation rates, particularly if an electrical or mechanical strobing device were employed. The most advantageous rate from the point of view of target discrimination is that modulation frequency which is most effective against target fading and temporal variations in the background, and this is dependent on scene and target characteristics. Typical backgrounds will consist of landscapes, seascapes or airscapes, and typical targets will be reflecting objects. Frequently, therefore, light from a pulsed laser employed in a viewing system will be reflected from the target but scattered from the background by atmospheric scattering.

In the embodiment of the present invention hereinbefore described, it is envisaged that repetitive interchange of the range interval viewed is carried out by corresponding repetitive interchange of the gating time period. The invention is by no means restricted to this means of range interval interchange. An alternative means for range interval interchange includes two detectors, each detector being gated to within a different time period to define a differing respective range interval. Interchange of the range interval viewed is then achieved by interchange of the gated detector from which the image registering device receives its signals. As a further alternative interchange means, a detector output can be connected to a variable time delay unit. The delay unit is connected to delivery signals from the detector to a gating device arranged to define a fixed gating time period. Varying the delay by means of the delay unit then effectively alters the gating time period for signals subsequently supplied to an image registering device. Those skilled in the art of electronics will appreciate that other means are also available for range interval interchange in accordance with applicant's invention. It is even possible, for example, to arrange for a shutter to obscure the detector during an appropriate section of a laser pulse repetition cycle. However, mechanical shutters can prove difficult to phase-lock to the laser cycle, and are not preferred as gating devices.

With reference once more to FIG. 1, the foregoing description of an embodiment of the invention calls for a detector 3 for the detection of laser pulses. Such a detector might advantageously be combined with a scanning device to track or scan the detector over a scene for the production of a two-dimensional image. Scanning devices are well-known in the art of electronics, a common arrangement using the flying-spot technique for the production of a television raster. A light-sensitive element as a detector might conveniently be combined with a scanning telescope to provide a raster pattern of a scene in two dimensions. Alternatively, the detector might be combined with a 360° rotational or one-dimensional scanning device as used in some radar equipment. Further alternative scanning arrangements will be apparent to those skilled in the appropriate arts.

A particular virtue of applicant's invention is that it provides a means for obtaining a target-seeking viewing system. With reference once more to FIGS. 2 and 3, the range differential $\Delta R$ ($R_1 - R'_1$), and the corresponding time differential $\Delta t$ ($t_3 - t'_3$), would be held constant while $R_1$ and $R'_1$ are varied together from minimum to the maximum permitted by the sensitivity of the viewing system. This procedure effectively provides for the range differential $\Delta R$, a range "window", to be scanned over the full distance within which the viewing system can detect targets. This scanning operation is one-dimensional and longitudinal of the direction of propagation of laser light, in contradistinction to the one- or two-dimensional scanning, transverse to the said propagation direction, which is referred to in the last preceding paragraph. One-dimensional scanning of the range differential $\Delta R$ would necessarily be carried out over a length of time which is much longer than the range interval interchange period. Scanning would be carried out by tracking the two gating time periods together across the laser pulse repetitive cycle. Alternately, corresponding means of gating time period variation could be employed for other gating techniques such as those mentioned in the penultimate preceding paragraph.

The advantage of scanning the range differential $\Delta R$ arises because viewing systems are frequently employed to search for targets having unknown locations. When $\Delta R$ is scanned as described, any targets present become modulated as they appear within this moving range differential. Accordingly the targets can be located by virtue of their modulation with the aid of monitoring personnel or automatic monitoring equipment. This one-dimensional scanning longitudinally of the laser beam can be accompanied by one- or two-dimensional transverse scanning as described above, thus providing means for a target search over an area or throughout a volume. Furthermore, once a target or targets are located, a feedback loop to the scanning control means can be provided, and the viewing system can be locked onto the target in response to the detection of a modulated signal.

A viewing system of the invention may employ two (or more) lasers of different output wavelengths. Both gating modes each corresponding to a respective range interval may then be operated simultaneously. Each mode would be processed in a separate channel before reaching common image registering means. Each channel would be gated separately to define respective range intervals, and the image registering means would be switched back and forth between channels to define positive and negative contrast modes. Equivalent dual gating techniques may also be used deriving from the various gating arrangements hereinbefore outlined.

A multi-laser arrangement possesses the advantage that more power is used to illuminate the target, and the detection of each laser output can be optimised separately. A shorter wavelength is more appropriate for producing atmospherically scattered light, whereas a longer wavelength is more appropriate for penetrating air, fog or smoke. The choice of laser wavelength will necessarily depend on the type of target sought and the atmospheric conditions likely to be encountered. The wavelength of each laser is chosen to maximise sensitivity in accordance with whatever mechanism is operative to return the laser energy to the detector. Situations may occur in which the type of target sought dictates an unusual choice of wavelength. Should, for example, an aerosol cloud be required to be detected, scattered light is likely to provide a stronger return signal than reflected light.

With two or more lasers of different wavelengths, the power available could be detected simultaneously, provided either that the laser pulses are phased to avoid mutual interference or that each laser wavelength is detected separately. This arrangement would permit faster scanning since several range intervals could be searched simultaneously. Equally, a multi-laser arrangement might be employed to detect several targets on the same bearing, provided that the targets did not obscure one another. In addition, it would be quite feasible to fit individual systems with spatial filters to produce preferential sensitivity to targets of particular geometries.

The viewing system hereinbefore described employed interchange between two range intervals to achieve modulation of an image of a target. This principle can be extended to interchange among several range intervals in the following manner. Consider four range intervals in ascending order of distance from the viewing system, A, B, C and D producing respective target images in reflection $A_1$, $B_1$, $C_1$ and $D_1$ and target images in silhouette $A_2$, $B_2$, $C_2$ and $D_2$. If the range interval interchange device is arranged to cycle the viewing system through the range intervals repetitively in the sequence A, B, C, D, then the image registering device will register as shown in the following Table 1:

| Range Interval Selected | Images Registered |
| --- | --- |
| A | $A_1$ |
| B | $A_2$ $B_1$ |
| C | $A_2$ $B_2$ $C_1$ |
| D | $A_2$ $B_2$ $C_2$ $D_1$ |

Table 1 shows that, with the range interval interchange sequence A, B, C, D repeated, $A_1$ or $A_2$ is detected on all four selected intervals, $B_1$ or $B_2$ on three, $C_1$ or $C_2$ on two, and $D_1$, the reflected image of the interval farthest from the viewing system, is detected once only to the exclusion of $D_2$. All four range intervals are therefore detected with varying recurrence. This procedure may be applied to any number of range intervals. The sequencing of the selected range intervals is not critical, and might even be random. Moreover, one or more of the intervals might be omitted on each sequence of interchanges, provided that, after an appropriate number of interchange sequences, enough laser energy is collected to locate targets in each range interval required to be viewed.

The foregoing discussion provides a description of a viewing system of the invention, together with an indication of some of the modifications, alternatives and applications appropriate for use in connection with such a system. Those skilled in the art of opto-electronics will appreciate that a wide range of instrumentation can usefully incorporate range interval interchange in accordance with the invention. It is therefore to be understood that the scope of the invention is in no way restricted by the foregoing description.

What is claimed is:

1. A laser-assisted viewing system including at least one laser arranged for repetitive pulsing, at least one detector to detect laser pulses after reflection or scattering from a scene, detector signal gating means to define two range intervals within the scene for viewing by the said system, means to register an image of any defined range interval, and switching means to repetitively interleaf said two defined range intervals from which the registered images are received whereby a target within a first of said two defined range intervals is alternately detected by reflection of transmitted energy and in silhouette by backscattering of transmitted energy.

2. A laser-assisted viewing system according to claim 1 wherein the said at least one laser is arranged for cyclical pulsing and the gating means is arranged for corresponding cyclical gating during at least two sections of the laser pulse repetition cycle, the said at least two sections each being shorter than the time interval between successive pulses of a pulse repetition cycle.

3. A laser-assisted viewing system according to claim 2 wherein the gating means is operative during one section of a pulse repetition cycle at a time, the two sections being selected from a plurality thereof and the switching means being adapted to interleaf the sections selected.

4. A laser-assisted viewing system according to claim 2 including a variable delay unit arranged to apply one time delay at a time to the detector signal, two time delays being selected from a plurality thereof and the switching means being adapted to interleaf the time delays selected.

5. A laser-assisted viewing system according to claim 2 including at least two detectors each arranged for cyclical gating in at least one respective section of a pulse repetition cycle, each detector defining a respective signal channel for supplying signals along one channel at a time to the image registering means, and wherein the switching means is operative to interleaf the channels supplying the said signals.

6. A laser-assisted viewing system according to claim 1 wherein the image registering means is a cathode ray tube.

7. A laser-assisted viewing system according to claim 1 wherein the image registering means is a recording device.

8. A laser-assisted viewing system according to claim 1 including two lasers each arranged for repetitive pulsing at a respective output wavelength, the detector signal gating means being arranged to define at least one range interval per laser and the switching means being operative to interleaf between the defined range intervals.

9. A laser-assisted viewing system according to claim 1 operative to register images of two range intervals having a range differential therebetween, the system also including scanning means arranged to vary the range intervals simultaneously such that the range differential may be scanned over a region within the target detection limits of the system, the scanning being one-dimensional and directed longitudinally of the laser propagation direction.

* * * * *